(No Model.)

S. L. TRIPPE.
SECONDARY OR STORAGE ELECTRIC BATTERY.

No. 385,390. Patented July 3, 1888.

WITNESSES:

Sylvanus L. Trippe,
INVENTOR

BY R. G. Dyrenforth
ATTORNEY.

N. PETERS, Photo-Lithographer, Washington, D. C.

United States Patent Office.

SYLVANUS L. TRIPPE, OF DENVER, COLORADO, ASSIGNOR TO THE ELECTRIC STORAGE LIGHT AND POWER COMPANY.

SECONDARY OR STORAGE ELECTRIC BATTERY.

SPECIFICATION forming part of Letters Patent No. 385,390, dated July 3, 1888.

Application filed August 27, 1885. Serial No. 175,505. (No model.)

*To all whom it may concern:*

Be it known that I, SYLVANUS L. TRIPPE, a citizen of the United States, residing in the city of Denver, in the county of Arapahoe and State of Colorado, have invented certain new and useful Improvements in Secondary or Storage Electric Batteries; and I hereby declare the following to be a full, clear, and exact description of the same.

This invention relates to secondary electric batteries.

In secondary or storage batteries constructed like those now in general use the loss of electrical energy by leakage, the difficulty of discharging from them a current of electricity of sufficient electro-motive force for practical purposes, the great weight and cost of construction in proportion to the end accomplished, the short life of the electrodes, and the necessity of using the batteries very soon after they are charged render them inadequate to produce the results which it is believed properly-constructed secondary or storage batteries should accomplish. To overcome these objections, and especially to secure the discharge of a sufficient current of electricity, I have designed a secondary or storage battery, as illustrated in the accompanying drawings, in which—

Figure 1:
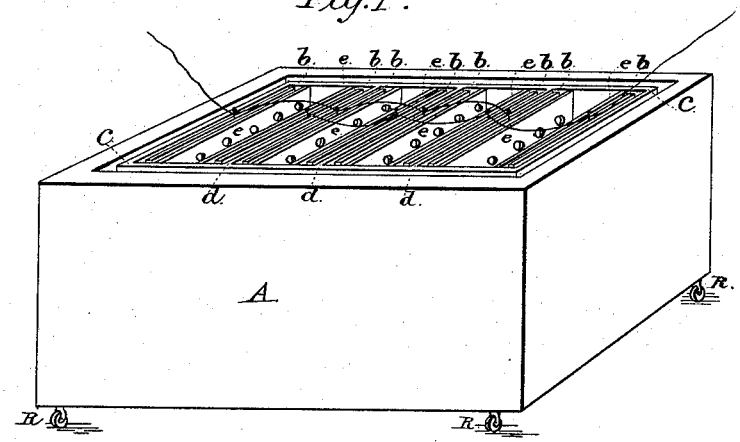
Figure 2:
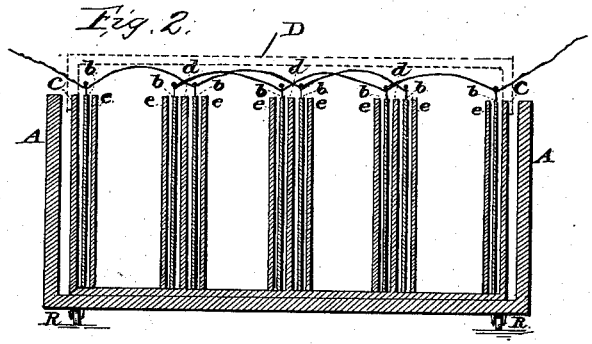

Figure 1 represents a perspective view of my cell with the cover removed, and Fig. 2 represents a view thereof in longitudinal section.

Referring to the drawings, A designates a case or box made of wood, provided with and supported on rollers R, made of glass or porcelain to insulate it. This case A is adapted to receive a glass or porcelain case, C, which is provided with a cover, D, of the same material. The glass or porcelain case C is provided with plates or strips e and d, arranged to form cells or compartments. In the cells or compartments thus provided are placed the electrodes b. The plates e are provided with perforations or openings to allow the battery-fluid to pass freely from one plate to another in each cell.

The electrodes are made preferably from an alloy or mixture of equal parts of lead and zinc, to which I add from five to ten per cent., by weight, of silver, which metals are melted and thoroughly mixed together and cast or otherwise formed into plates of the desired size. The plates when constructed are "formed" or prepared for use in the battery by the Planté or some similar well-known process.

The elements or electrodes are placed in the cells or compartments and are coupled or joined in series by proper conductors fastened to the binding-screws cast in the top of the electrodes or plates, as shown in Fig. 2 of the drawings. Around each element or plate may be packed the oxide of lead or other suitable material, as desired.

To prevent any leakage of electric energy on account of moisture or from any other cause, the glass or porcelain case having the cells in which the electrodes are is placed in the wooden vessel or case, said glass or porcelain case being provided with the close-fitting cover of the same material which serves to insulate the plates and fluid contained in the glass or porcelain case from everything except through the proper conductors.

The wooden case which receives the glass or porcelain vessel or case protects the same from injury, and by the glass or porcelain rollers with which it is provided is itself insulated.

Having thus fully described my invention, what I claim as new, and desire to secure by Letters Patent, is—

In a secondary or storage battery, the wooden insulated case, in combination with the glass or porcelain case provided with a cover of the same material, said case having cells the outer walls of which are provided with perforations, substantially as described.

SYLVANUS L. TRIPPE.

Witnesses:
W. C. GHOST,
GEO. E. PLIMPTON.